United States Patent [19]

Gross et al.

[11] Patent Number: 5,122,941
[45] Date of Patent: Jun. 16, 1992

[54] VIDEO TERMINAL ACCESSORY

[75] Inventors: Clifford Gross, Roslyn; Patricia Cooper, Great Neck, both of N.Y.

[73] Assignee: Biomechanics Corporation of America, Mellville, N.Y.

[21] Appl. No.: 735,616

[22] Filed: Jul. 25, 1991

Related U.S. Application Data

[63] Continuation-in-part of Ser. No. 586,691, Sep. 24, 1990, Pat. No. 5,035,392.

[51] Int. Cl.$^5$ ............................................. F21V 23/00
[52] U.S. Cl. ...................................... 362/276; 362/98; 362/234; 362/419; 248/442.2; 248/918
[58] Field of Search ............... 248/442.2, 457, 918; 362/33, 98, 99, 234, 253, 419, 431, 276, 295, 802

[56] References Cited

U.S. PATENT DOCUMENTS

| | | |
|---|---|---|
| 1,216,321 | 2/1917 | Inami . |
| 1,609,418 | 5/1926 | Nechamkin et al. ............ 248/442.2 |
| 1,879,284 | 7/1931 | Johnson et al. . |
| 3,351,312 | 11/1967 | Ballas . |
| 3,905,573 | 9/1975 | Davis ...................................... 248/445 |
| 4,475,705 | 10/1984 | Henneberg et al. ............ 248/447.2 |
| 4,582,285 | 4/1986 | Bello ............................... 248/442.2 |
| 4,619,429 | 10/1986 | Mazza ............................. 248/447.2 |
| 4,632,471 | 12/1986 | Visnapuu ............................. 312/233 |
| 4,693,443 | 9/1987 | Drain ............................... 248/447.1 |
| 4,747,572 | 5/1988 | Weber ............................. 248/442.2 |
| 4,767,093 | 8/1988 | Jones ............................... 248/442.2 |
| 4,836,489 | 6/1989 | Chu ................................. 248/442.2 |
| 4,848,710 | 7/1989 | Newman ............................. 248/129 |
| 4,869,565 | 9/1989 | Bachman ............................. 312/234 |
| 4,874,989 | 10/1989 | Nilssen ............................... 315/151 |
| 4,902,078 | 2/1990 | Judd ................................. 312/7.2 |
| 4,934,648 | 6/1990 | Yueh ............................... 248/442.2 |
| 4,949,933 | 8/1990 | Stone ............................... 248/442.2 |
| 4,960,257 | 10/1990 | Waters ............................. 248/442.2 |
| 5,035,392 | 7/1991 | Gross et al. ...................... 248/918 X |

Primary Examiner—Stephen F. Husar
Attorney, Agent, or Firm—Marmorek, Guttman & Rubenstein

[57] ABSTRACT

An accessory device for use in connection with a video terminal comprises an attachment mechanism for mounting a display board on either or both sides of a video terminal. The display boards are pivotable about both horizontal and vertical axes. The accessory includes a lighting fixture for illuminating the surface of each display board and a circuit for automatically adjusting the intensity of light produced by each ligthing fixture to maintain a constant predetermined level of illumination on the surface of each display board. The video accessory increases the vertical work surface available for use by a video terminal operator and results in a work station area which is more comfortable for the video operator.

9 Claims, 3 Drawing Sheets

VIDEO TERMINAL ACCESSORY

This is a continuation-in-part of application Ser. No. 07/586,691, filed Sep. 24, 1990, now U.S. Pat. No. 5,035,392.

FIELD OF THE INVENTION

The present invention relates to an accessory which attaches to a video terminal or computer monitor and includes display boards for increasing the vertical work surface available to the operator of the video terminal. More particularly, the present invention relates to an adjustable accessory which attaches to a video terminal or computer monitor and which includes display boards for holding copy paper or other materials used in conjunction with the computer. The position of the display boards may be adjusted in several different directions to reduce glare and maximize the user's comfort. The display boards have a lighting fixture attached to them for automatically illuminating the materials on the display boards at a desired level of illumination.

BACKGROUND OF THE INVENTION

Presently, the video terminal is a standard piece of equipment in the office environment. However, most video terminals are ergonomically unsatisfactory for video terminal operators. One reason is that there is usually not enough vertical work surface available to the operator to display materials that the operator needs to use or refer to. Such materials may include copy paper containing information to be transcribed into the computer, information regarding use of the computer, schedules, etc.

As a result, a variety of devices have been proposed to increase the vertical work surface associated with a video terminal. However, for a variety of reasons these prior art devices have proven unsatisfactory. U.S. Pat. No. 4,869,565 (Bachman) discloses one example of an adjustable display apparatus which fits about and is affixed to the housing of a computer monitor screen. The display apparatus disclosed therein has an adjustable top which allows it to be fitted onto different sized monitor screens. The display apparatus also includes two display boards to which a user can affix notes or other materials. The display boards are mounted along the sides of the monitor screen. The positions of these display boards are not adjustable and they are at all times parallel to the face of the monitor screen. Thus, no provision is made to reduce glare or maximize the comfort of the user by adjusting the positions of the display boards. Furthermore, the accessory of this patent does not include any special lighting fixtures for illuminating the materials held on the display boards at a desired predetermined illumination level.

U.S. Pat. No. 4,619,429 (Mazza) discloses an accessory which attaches to a computer monitor and includes display boards which are adjustable relative to the face of the monitor screen. This accessory includes a harness assembly by means of which the accessory is strapped to the monitor. The adjustment mechanism for the display boards of this accessory is a rather complicated structure. Although this accessory permits some swivelling adjustment of the display boards, the overall structure of this accessory is quite cumbersome and it is difficult to use. Clearly, such an accessory would not find practical use in most offices. Furthermore, this accessory also does not include any special lighting fixtures for illuminating the materials mounted on the display board at a desired predetermined illumination level.

U.S. Pat. No. 4,632,471 (Visnapuu) discloses a computer accessory comprising a display framing panel and at least one display board which extends from a side of the display framing panel. The display framing panel fits over the front surface of the monitor screen and includes a window through which the screen may be viewed. The display board may be made integral with the display framing panel, or may be attached by means of hinges which allow pivotal angular adjustment of the display board relative to the display framing panel. While this accessory does provide for limited pivoting action, it too is a cumbersome piece of equipment, not especially well-suited for most offices. It too does not include any special lighting fixtures for illuminating materials mounted on the display board.

U.S. Pat. No. 4,902,078 (Judd) discloses an accessory which is mounted by means of Velcro strips onto the corner of a monitor screen. This accessory includes a swingable display board. However, the accessory of this patent does not permit any out-of-plane rotation of the display board. Furthermore, this accessory also does not include any special lighting fixture attached to the display board for illuminating the materials thereon.

U.S. Pat. No. 4,475,705 (Henneberg et al) discloses yet another accessory for a computer monitor. The document holder of this patent is attached by a ribbon-like easel bracket which fits in an annular groove of the display terminal cover. The document holder of this accessory is not adjustable relative to the easel bracket and no lighting fixtures are attached to the display board.

Other accessories which include display boards designed to be attached to a computer monitor screen include those described in U.S. Pat. Nos. 4,693,443 (Drain); 4,747,572 (Weber); 4,767,093 (Jones); 4,836,489 (Chu); and 4,934,648 (Yueh). The accessories of these latter patents consist primarily of clips for holding copy paper, which clips are attached by one means or other to a computer monitor. None of these accessories includes a display board or a separate illuminating mechanism for illuminating the materials held on a display board.

In view of the foregoing, it is an object of the present invention to provide a simple video terminal accessory for increasing the available vertical work surface and comprising at least one display board which is adjustable in a number of different directions to reduce glare and maximize comfort, and which also has a lighting fixture attached to it for illuminating any materials held on the display board to a predetermined desired level of illumination.

SUMMARY OF THE INVENTION

In accordance with the present invention an accessory device for use with a video display terminal comprises an attachment mechanism for mounting a display board on either or both sides of a video display terminal. Each such display board is pivotable around both horizontal and vertical axes to provide maximum comfort for the video display terminal operator. The accessory also includes a lighting fixture for illuminating the surface of each display board. Associated with each lighting fixture is a circuit for controlling the amount of light emitted by the lighting fixture so as to maintain the illumination of the corresponding display board at a constant predetermined level. As a result of these features, the accessory of the present invention serves to convert an ordinary video display terminal into a more ergonomically satisfactory work area.

DETAILED DESCRIPTION OF PREFERRED EMBODIMENTS

Figure 1:
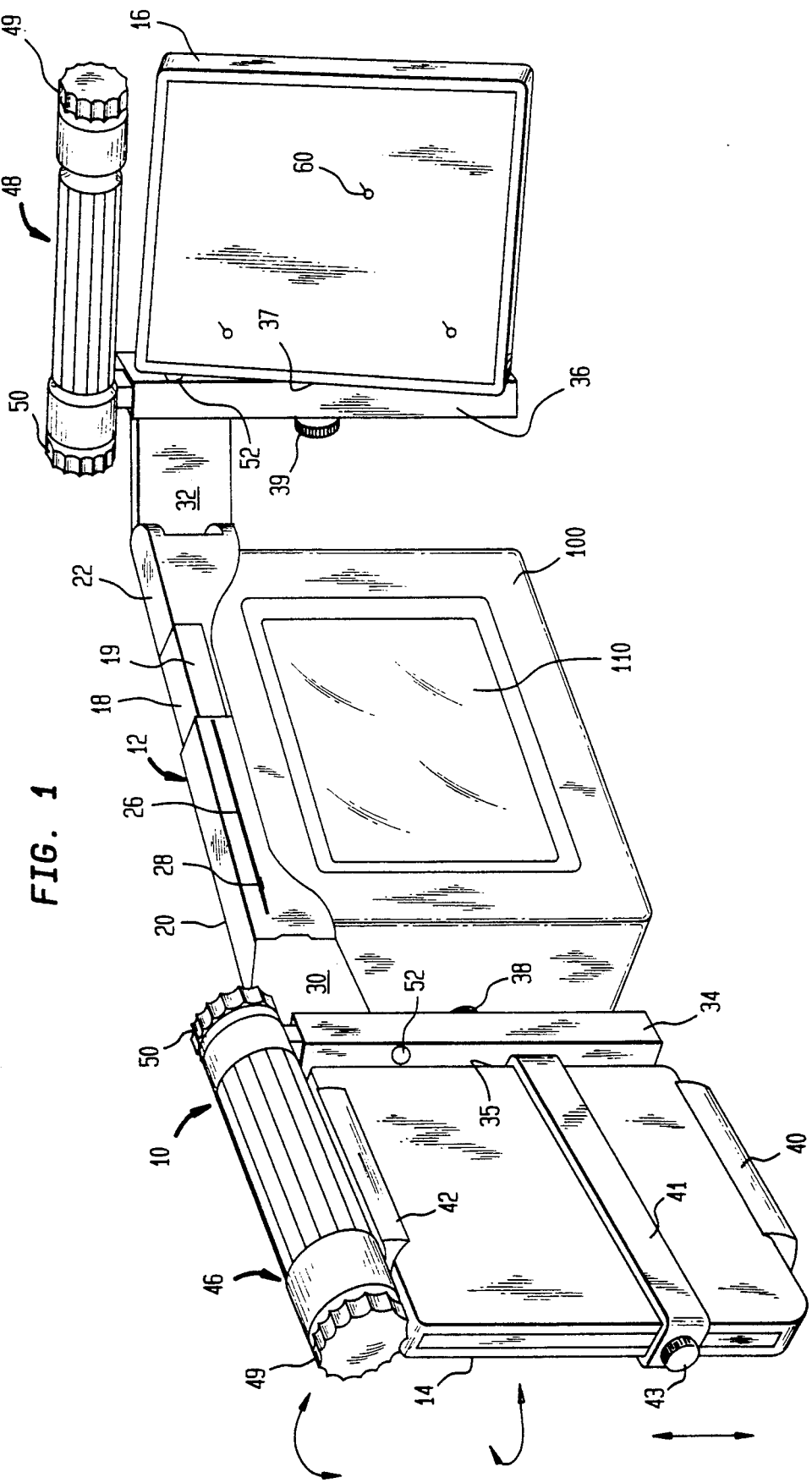
FIG. 1 is a perspective view of one embodiment of the present invention.

Turning to FIG 1, a video terminal 100 including a screen 110 is illustrated. Associated with the video terminal 100 is an accessory 10 in accordance with an illustrative embodiment of the present invention.

The accessory 10 is comprised of an adjustable holder 12 for attaching the accessory 10 to the video terminal 100 and two display boards 14 and 16 which extend from the holder. While two display boards are shown, it should be appreciated that the inventive video terminal accessory may also be constructed with only a single display board if that is desired.

The holder 12 comprises a flat base plate 18 having a downwardly projecting lip 19 and two shoulder portions 20 and 22 attached to the base plate 18. The shoulders 20 and 22 are sized to fit over the corners of the video terminal 100. The width of base plate 18 is sized to fit over an upper ledge which is present on many modern video terminals with the lip 19 engaging the side of the ledge. The shoulders 20 and 22 are movable relative to each other and the base plate 18 in order to accommodate video terminals of different widths. In the illustrated embodiment, the shoulder 22 is fixed by being integral with the base plate 18, while the shoulder 20 includes a horizontal slot 26 through which a tab 28 from the base plate 18 projects. The shoulder 20 thus is capable of sliding along base plate 18. By means of this construction, the video terminal accessory 10 is adjustable so as to fit over the top of video terminals of different widths.

The shoulders 20,22 have hinging mechanisms 30,32 by means of which vertical posts 34,36 of display boards 14,16 are attached to the holder 12. The hinging mechanisms 30,32 permit the display boards 14 and 16 to be swivelled through arcs of about 180° around vertical axes passing through the hinging mechanisms. The display boards 14,16 are mounted on the posts 34,36 by means of central pivot pins 35,37 (shown only in part). Knurled knobs 38,39, attached to the ends of the pivot pins which protrude through posts 34,36, may be used to swivel the display boards 14,16 about axes passing through the pivot pins. Thus, each display board 14,16 may be pivoted about a vertical axis passing through a post 34,36 and about a horizontal axis passing through a central pivot pin 35,37.

The display board 14 includes a support 40 at its bottom for holding copy paper and a clip 42 at its top for keeping such copy paper in place. The display board 14 also includes a transparent line guide 41 which can be adjusted upward and downward by means of the knurled knob 43 to different vertical positions. The display board 16 may be similar to display board 14, or, as illustrated, may be constructed in the form of a bulletin board with a cork-like surface for receiving tacks 60.

The lighting fixtures 46,48 are attached to the posts 34,36 so that they are suspended over the display boards 14,16. Preferably, the lighting fixtures contain fluorescent bulbs although other types of lighting are also within the scope of the present invention. Each lighting fixture has a first rotatable 10 switch 49 at one end thereof, and a second rotatable switch 50 at its other end. The rotatable switch 49 is used to vary continuously the light intensity between a LO setting and a HI setting. The second switch 50 is a three-position switch which is used to select the mode of operation for the lighting fixture. The switch 50 may be set to OFF, in which case there is no illumination, or to MANUAL, in which case the intensity is determined by the setting on switch 49 and remains at that level. The switch 50 may also be set to AUTO, in which case the intensity of light from the lighting fixture is automatically adjusted depending on the intensity of ambient light as determined by a sensor 52 so that there is a predetermined illumination level on the surface of the boards 14 or 16. In FIG 1, a sensor 52 is mounted on each post 34,36 for the lighting fixtures 46 and 48 respectively.

A circuit which controls the operation of each lighting fixture 46,48 may be located inside the corresponding vertically extending posts 34,36. The circuit for each lighting fixture 46,48 includes the corresponding sensor 52 and is connected to the corresponding switches 49 and 50.

Figure 2:
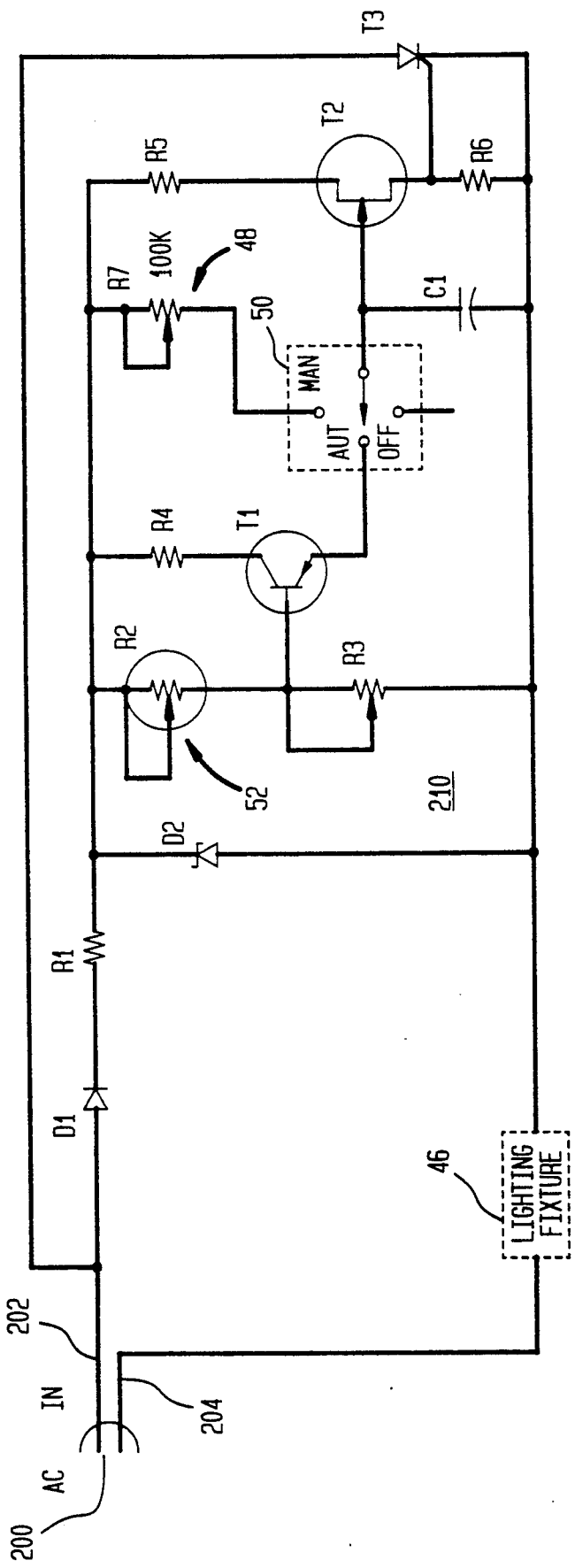
FIG. 2 is a circuit diagram of the automatic lighting feature of the present invention.

A circuit for controlling the amount of light produced by a lighting fixture, e.g., the lighting fixture 46, is shown in FIG. 2.

The circuit of FIG. 2 includes an input 200 for receiving an AC voltage from a mains supply. The AC voltage is supplied between the AC high line 202 and the AC low line 204. Power is supplied to the lighting fixture 46 through the silicon controlled rectifier T3. The firing angle of the silicon controlled rectifier T3 is controlled by the control circuit 210. Under control of the control circuit 210, the silicon controlled rectifier T3 is turned on for a fraction of every other half-wave cycle of the AC voltage signal.

The control circuit includes the switch 50 for determining whether the lighting fixture 46 is manually controlled or is automatically controlled so that the intensity of light on the corresponding display board is maintained at a predetermined desired level.

The control circuit 210 includes the diode D1 for receiving a portion of the AC input voltage and for half-wave rectifying this signal. The diode D1 is followed by the current limiting resistor R1. The zener diode D2 develops a voltage of about 20 volts during every other half-wave cycle of the AC input voltage and serves as a voltage supply for the control circuit.

When the switch 30 is set to manual control, the capacitor C1 is charged up through the potentiometer R7. When the voltage on the capacitor C1 reaches a certain level such as 13 volts, for example, the unijunction transistor T2 becomes conducting and a signal is applied to the silicon controlled rectifier T3 to apply power to the lighting fixture.

The time for the capacitor C1 to reach the turn on voltage of T2 is determined by the resistance of the potentiometer R7. This resistance of the potentiometer R7 in the circuit of FIG. 2 is controlled by the switch 49 in FIG. 1. When a large resistance is chosen for R7 the charging time of the capacitor C1 is longer and the silicon controlled rectifier is fired relatively late in each half-wave cycle so that a relatively small amount of power is applied to the lighting fixture. Similarly, when a smaller resistance is chosen for R7, the charging time of the capacitor C1 is shorter so that the silicon controlled rectifier is fired earlier in a half-wave cycle, whereby more power is applied to the lighting fixture. It should be noted that the capacitor C1 discharges through the resistor R6. The resistor R5 is a temperature compensation resistor.

When the switch 50 is set for automatic control, the capacitor C1 charges through the resistor R4 and the transistor T1 when the transistor T1 is conducting. Thus, the time at which T3 is fired is ultimately determined by when T1 becomes conducting. The resistors R2 and R3 form a voltage divider. The resistor R2 is a photoresistor which forms the sensor 52 of FIG 1. The resistance of R2 increases as the ambient light decreases. In the presence of relatively little ambient light, the resistance of R2 increases and the voltage across R2 exceeds the threshold for turning on T1 earlier in a half-wave cycle so that C1 begins to charge up earlier in the half-wave cycle, thereby causing T3 to fire earlier to apply more power to the lighting fixture 46. Similarly, in the presence of a large amount of ambient light, the resistance of R2 decreases and T1 is turned on later in a half-wave cycle so that T3 is turned on later in the half-wave cycle and less power is applied to the lamp.

Figure 3:
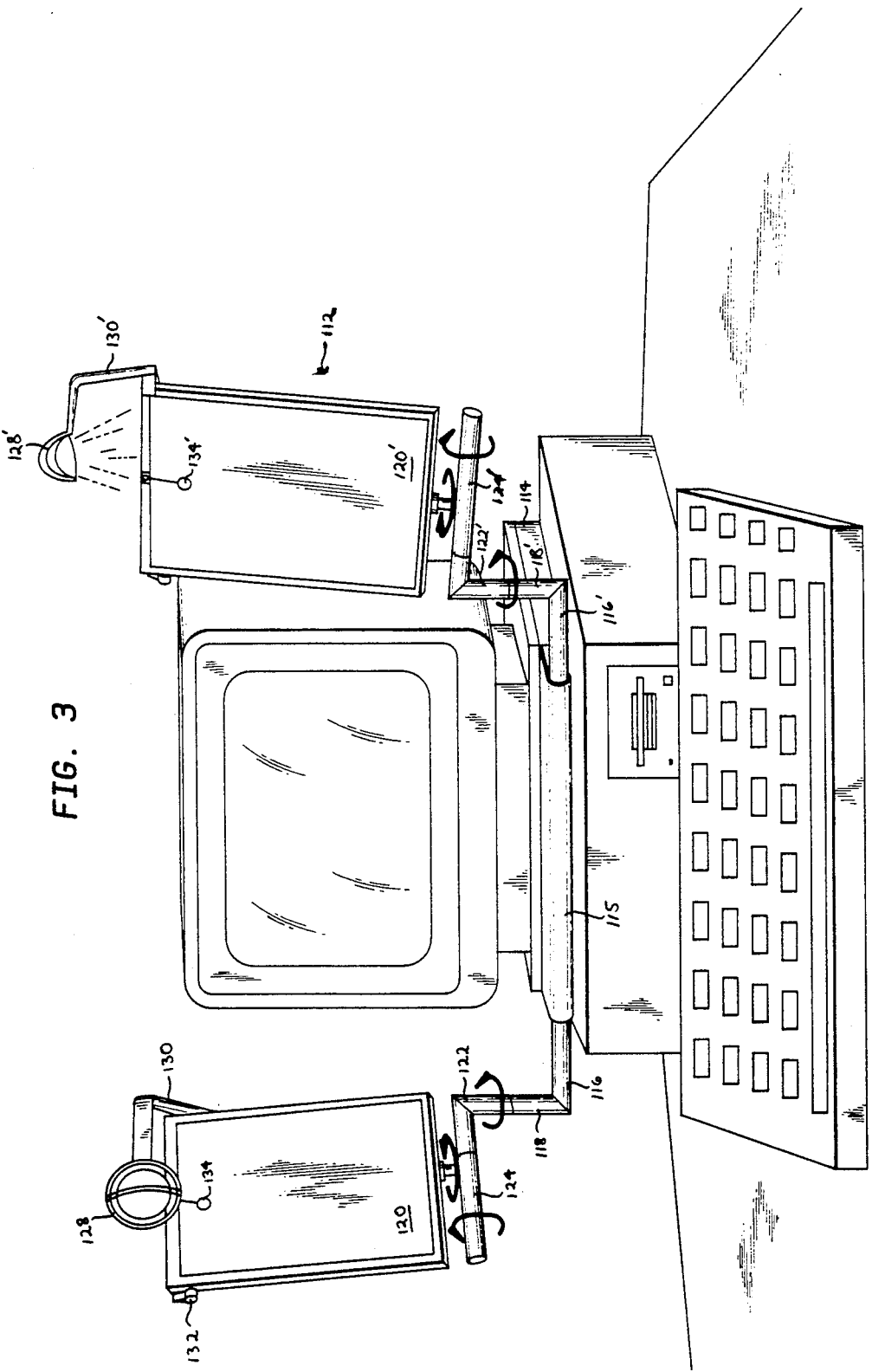
FIG. 3 is a perspective view of another embodiment of the present invention.

FIG. 3 shows another embodiment of the invention. In this embodiment, a video terminal accessory 112 is shown mounted on a personal computer. The accessory 112 comprises a base member 114 on which the video terminal is mounted. The front of the base member 114 is developed into a hollow cylindrical front portion 115 which receives a tubular member 116 therein. Tubular member 116 is a single piece construction with two upturned arms 118, 118' at each end. Alternatively, tubular member 116 may comprise two equal tubular pieces, each of which is slidable within the cylindrical front portion 115 of base member 114. This permits separate adjustment of each of the display boards 120, 120' as to its distance from the video terminal. Furthermore, tubular member 116, whether it is a single piece or divided in two, may be rotatable within the cylinder of front portion 115 of base member 114 for additional adjustment relative to the video screen.

Tubular elbows 122, 122' are mounted by means of internal connectors to each arm 118, 118' of tubular member 116. The internal connectors (not shown) are short tubular pieces surrounded by neoprene which fit into the internal passages of elbows 122, 122' and tubular member 116. The internal connectors may be such as to fix the orientation of elbows 122, 122' relative to the tubular member 116, or, more desirably, may permit rotation of the elbows 122, 122' about vertical axes, as shown by the arrows in FIG. 3. Another set of tubular members 124, 124' are mounted on the ends of elbows 122, 122' by means of another set of internal connectors (not shown). Again, the tubular members 124, 124' may be fixed relative to the elbows 122, 122', or they may be rotatable relative thereto as shown by the arrows in FIG. 3.

The display boards 120, 120' are mounted onto the tubular members 124, 124' by means of posts 126 126' which extend up and behind the display boards. The posts 126, 126' may be fixed in the tubular members 124, 124', or, more preferably, may be rotatably mounted therein, as shown by the arrows. In this latter construction, the display boards rotate about the posts 124, 124' into an angle which is comfortable for the user of the computer.

In order to illuminate any materials mounted on the display boards, lighting fixtures 128, 128' are mounted directly onto the display boards 120, 120' by means of the arms 130, 130'. As shown in FIG. 3, arms 130, 130' permit adjustments of the position of the lighting fixtures. Switches 132, 132, which carry out the same functions as the switches in the previous embodiment of the invention are located on the sides of the display boards 120, 120'. As in the previous embodiment, the intensity of illumination may be automatically adjusted by a control circuit built into base member 114. The circuit is similar to that shown in FIG. 2 and is responsive to the sensors 134, 134' which in this case are placed on top of the illuminated materials.

In short, a video terminal accessory has been disclosed which fits onto most video terminals with a minimum of effort. Illustratively, the video accessory is provided with one or two display boards, each of which may be rotated about different pivot axes. These boards may be used to display documents being worked on by the operator of the video terminal or may be utilized as bulletin boards. The video terminal accessory of the present invention serves to increase the vertical work surface available to the operator of the video terminal and results in a work station which is more comfortable and easier to use than the video terminal would be without the accessory.

In addition, the video accessory of the present invention includes an automatic lighting feature which maintains a constant predetermined level of illumination on the display boards, even when ambient light levels become low, thereby insuring that a video terminal operator has adequate lighting to preform his/her job.

While the invention has been described by reference to preferred embodiments, this was for purposes of illustration only and should not be deemed to limit the spirit or the scope of the invention. Numerous alternative embodiments will be apparent to those skilled in the art.

We claim:

1. A computer accessory for holding materials used in conjunction with a computer, comprising
   attachment means for removably mounting said accessory onto said computer,
   at least one display board for holding said materials adjacent to said computer, and
   adjustable support means connected to said attachment means for adjustably supporting said display board, said support means comprising first, second and third tubular members, said first tubular member being connected to said attachment means, said second tubular member being connected to said first tubular member and being rotatable relative thereto, said third tubular member being connected to said second tubular member and being rotatable relative thereto.

2. The computer accessory of claim 1 wherein said first tubular member is slidable relative to said attachment means.

3. The computer accessory of claim 1 wherein said first tubular member is rotatable relative to said attachment means.

4. The computer accessory of claim 1 wherein said second tubular member is rotatable relative to said first tubular member about an axis which is common to said first and second tubular members.

5. The computer accessory of claim 1 wherein said third tubular member is rotatable relative to said second tubular member about an axis common to said second and third tubular members.

6. The computer accessory of claim 1 further comprising a post connected to said third tubular member, said display board being mounted on said post.

7. The computer accessory of claim 6 wherein said display board is rotatable about said post.

8. The computer accessory of claim 1 further comprising lighting means on said display board for illuminating said materials held by said display board, said lighting means including light sensing means for sensing the level of illumination said board and automatic adjustment means for automatically adjusting the intensity of light from said lighting means in response to said light sensing means to maintain a predetermined level of illumination on said display board.

9. The computer accessory of claim 1 wherein said second tubular member is elbow shaped.

* * * * *